(No Model.)
J. W. DAVIS.
APPARATUS FOR LIGHTING BUILDINGS.
No. 507,999. Patented Nov. 7, 1893.
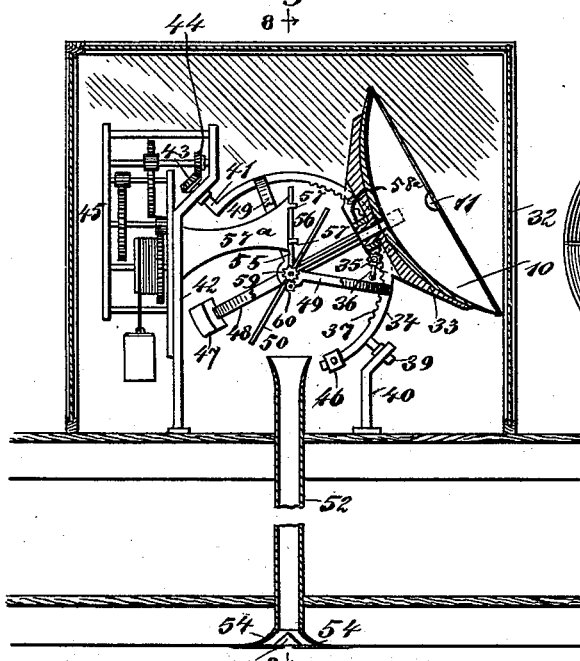
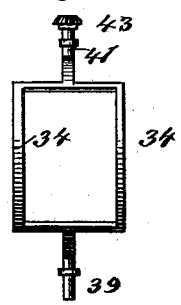
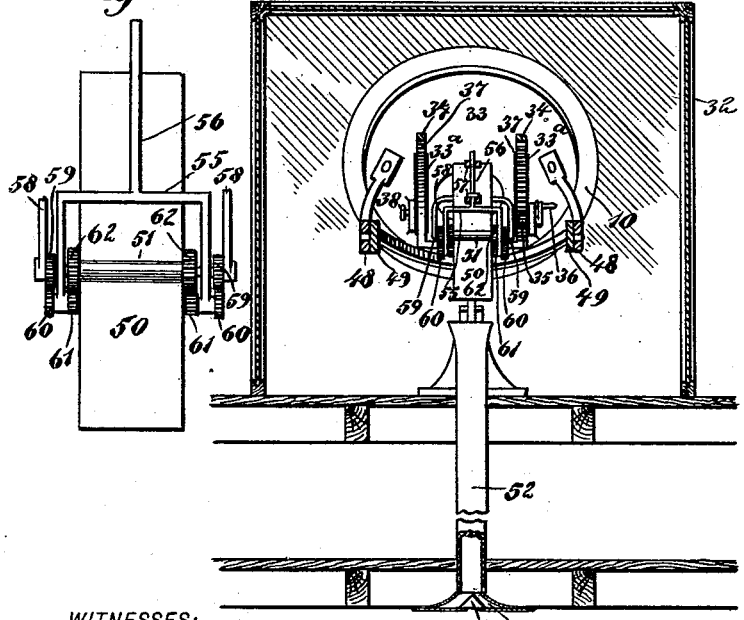
WITNESSES:
J. C. Criswell
C. Sedgwick
INVENTOR
J. W. Davis
BY Munn & Co
ATTORNEYS.

UNITED STATES PATENT OFFICE.

JOHN W. DAVIS, OF NEW YORK, N. Y.

APPARATUS FOR LIGHTING BUILDINGS.

SPECIFICATION forming part of Letters Patent No. 507,999, dated November 7, 1893.

Application filed July 26, 1892. Serial No. 441,269. (No model.)

*To all whom it may concern:*

Be it known that I, JOHN W. DAVIS, of New York city, in the county and State of New York, have invented a new and Improved Apparatus for Lighting Buildings, of which the following is a full, clear, and exact description.

My invention relates to improvements in an apparatus for lighting the interiors of buildings, such as interior rooms, basements and lofts which cannot be readily lighted by windows, and the object of my invention is to provide a simple and convenient way for lighting such places, and to do this by an apparatus occupying but little space, the functions of the apparatus being to first condense the beams of light, then carry them to the desired locality, and again diffusing them through the interior to be lighted, the result being obtained by a peculiar arrangement of mirrors operated by clock-work.

To this end, my invention consists in an apparatus which will be hereinafter described and claimed.

Reference is to be had to the accompanying drawings, forming a part of this specification, in which similar figures of reference indicate corresponding parts in all the views.

Figure 1 is a broken sectional elevation of my improved apparatus. Fig. 1ª is a plan view of the mirrors. Fig. 2 is a vertical section on line 8—8 of Fig. 1. Fig. 3 is a broken detail elevation of the plane deflecting mirror for throwing rays of light into a conduit, and the gear mechanism for operating the plane mirror in conjunction with the paraboloidal mirror. Fig. 4 is a detail plan of the track frame on which the main mirror moves.

Within a transparent casing 32—which is in practice erected upon the top of a building—I place the apparatus I employ, it being so constructed that the main reflector, or mirror, will follow the sun and deflect its light into the building.

10 indicates (see Figs. 1 and 1ª) a concave parabolic mirror having a circular top, and 11 is a convex parabolic mirror which is supported centrally above or over the concave mirror 10 by means of rods 12, as shown in Fig. 1ª.

52 indicates a light conduit, the interior surface of which is polished. This extends down through one or more floors of a building, also having a small convex mirror 53, at the bottom.

The main or concave mirror 10 has a central circular aperture for transmission of light. It is supported upon a convex backing or frame 33, which has two grooves 33ª fitting and receiving the parallel sides of a semicircular track frame 34, so that the backing or frame can slide upon the track frame.

The mirror 10 and its supporting frame can be caused to slide on the track frame 34 by means of a cog wheel 35, which is journaled in the frame and turned by a crank 36, this cog wheel meshing with a rack 37 on the under side of the track frame. The mirror and supporting frame are held in any position upon the track by means of a clamping screw 38.

The track frame 34 is shown in detail in Fig. 4, and has at its lower end a trunnion 39 which is journaled in a support 40, and at its upper end a similar trunnion 41, which is journaled in a support 42 of the clockwork mechanism, this upper trunnion having at its extreme end a pinion 43, meshing with a pinion 44 of the clockwork mechanism 45, this latter being of the kind usually employed to move astronomical telescopes and adapted to turn the apparatus at a suitable rate of speed. The two trunnions 39 and 41 are hung in relation to each other so that the rotation axis of the track frame is parallel to the rotation axis of the earth. The clockwork mechanism turns the frame at the same rate the sun travels, and the mirror 10, being clamped to the track frame in a position corresponding to the latitude of the sun for any day of the year, will always be presented full to the sun in its course from morning till night. The frame 34 has at its lower extremity a counterbalance 46, which is intended to counterbalance the frame only.

The mirror 10 and its supporting frame 33, are counterpoised by means of a weight 47, clamped upon a nearly circular ring 48, which at its opposite side is secured to the frame 33. The center of this ring is coincident with the center of the track frame, and the plane of the ring is at right angles to the axial plane of the track frame. This ring 48 swings upon two pivots supported by the circular arms 49, which are secured to the track frame 34, two on one side and two on the other at right angles with the track frame, and forming with it a portion of the same spherical surface.

The counterbalances 46 and 47 serve to hold the apparatus perfectly steady and enable it to move very easily. The precise form of carrying mechanism is not very essential however, as it is obvious that the mirror may be supported and driven by clockwork in many ways so as to follow the sun.

A plane mirror 50 is suspended centrally on a shaft 51, so that its reflecting surface contains the axis of rotation, and is automatically moved so that said reflecting surface at all times makes equal angles with the axis of the concave mirror 10 and the axis of the conduit 52 which extends downward into the building and has the deflecting and expanding mirrors 53 and 54 at its lower end, these being arranged and operated substantially like those already described. The mirror is supported by a yoke 55, which has a shank 56 held adjustable in supports 57 on the hanger 57ª carried by the clockwork mechanism, and this arrangement enables the yoke to be turned to any desired angle. The shaft 51 has its outer ends journaled in arms 58, which at their upper ends terminate in a collar 58ª journaled on the frame 33 and around the central aperture of the main mirror, and these arms carry at their lower ends gear wheels 59, which mesh with gear wheels 60 on short shafts carried in the lower ends of the yoke 55, and these shafts are also provided with gear wheels 61, which engage gear wheels 62 on the shaft 51, and consequently as the mirror 10 is moved either by clockwork or up and down on the track frame to correspond with the sun's latitude, the arms 58 and the connecting gear mechanism will change the position of the shaft 51 and mirror 50, so as to swing the latter into the correct position in relation to the concave mirror. It will be seen that it is an easy matter to regulate the size of the gears so that the plane mirror shall always be moved at the correct speed. In this way the surface of the plane mirror is at all times automatically held so as to make equal angles with the axis of the plane mirror and the axis of the conduit 49.

Having thus described my invention, I claim as new and desire to secure by Letters Patent—

1. In an apparatus of the character described, the combination with the light conduit, of a concave paraboloidal mirror supported and adapted to travel above the conduit, a convex paraboloidal mirror held at the focus of the concave mirror and adapted to throw beams of light through an aperture in the latter, and a plane deflecting mirror held to receive the beams of light and throw them into the conduit, substantially as described.

2. In an apparatus of the character described, the combination of the light conduit, the main concave and convex mirrors arranged to move above the conduit and to concentrate the rays of light, the plane mirror arranged to deflect the concentrated rays and throw them into the conduit, and a gear mechanism to move the main mirrors and the plane mirror in unison, substantially as described.

JOHN W. DAVIS.

Witnesses:
WARREN B. HUTCHINSON,
E. M. CLARK.